United States Patent
Choi et al.

(10) Patent No.: US 11,197,276 B2
(45) Date of Patent: Dec. 7, 2021

(54) METHOD FOR TRANSMITTING AND RECEIVING UPLINK CONTROL CHANNEL AND SOUNDING REFERENCE SYMBOL, AND APPARATUS THEREFOR

(71) Applicant: LG ELECTRONICS INC., Seoul (KR)

(72) Inventors: Kukheon Choi, Seoul (KR); Jiwon Kang, Seoul (KR); Kyuseok Kim, Seoul (KR); Minki Ahn, Seoul (KR); Kilbom Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 188 days.

(21) Appl. No.: 16/475,365

(22) PCT Filed: Dec. 14, 2017

(86) PCT No.: PCT/KR2017/014700
§ 371 (c)(1),
(2) Date: Jul. 1, 2019

(87) PCT Pub. No.: WO2018/128296
PCT Pub. Date: Jul. 12, 2018

(65) Prior Publication Data
US 2021/0136748 A1 May 6, 2021

Related U.S. Application Data

(60) Provisional application No. 62/441,953, filed on Jan. 3, 2017.

(51) Int. Cl.
*H04W 4/00* (2018.01)
*H04W 72/04* (2009.01)
*H04L 5/00* (2006.01)

(52) U.S. Cl.
CPC ....... *H04W 72/0413* (2013.01); *H04L 5/0048* (2013.01)

(58) Field of Classification Search
USPC ........................................................ 370/329
See application file for complete search history.

(56) References Cited

U.S. PATENT DOCUMENTS

| 2010/0008333 | A1* | 1/2010 | Kim ...................... H04L 5/0053 |
| | | | 370/336 |
| 2019/0053223 | A1* | 2/2019 | Zhou ...................... H04L 5/0051 |

OTHER PUBLICATIONS

Samsung "Sounding RS multiplexing in E-UTRAN UL interaction with PUCCH", R1-073570 (Year: 2016).*

(Continued)

*Primary Examiner* — Maharishi V Khirodhar
(74) *Attorney, Agent, or Firm* — Lee, Hong, Degerman, Kang & Waimey

(57) ABSTRACT

A method for transmitting, by a terminal, an uplink control channel and a localized SRS comprises the steps of: receiving, from a base station, first control information for triggering transmission of the uplink control channel and second control information for triggering transmission of the localized SRS; and if a transmission resource of the triggered uplink control channel overlaps with a transmission resource of the triggered localized SRS and the length of a frequency band of the localized SRS is shorter than or equal to the length of a coherent bandwidth, dividing the uplink control channel into a plurality of uplink control channel sub-blocks on a frequency domain and transmitting the divided uplink control channel sub-blocks, wherein the divided uplink control channel sub-blocks may be frequency division multiplexed with the triggered localized SRS and transmitted on one symbol.

7 Claims, 15 Drawing Sheets

(56) References Cited

OTHER PUBLICATIONS

Samsung, R1-1612490, "Discussion on SRS transmission in NR" (Year: 2016).*
PCT International Application No. PCT/KR2017/014700, Written Opinion of The International Searching Authority dated Mar. 27, 2018, 24 pages.
Samsung, "Discussion on SRS transmission in NR", 3GPP TG RAN WG1 Meeting #87, R1-1612490, Nov. 2016, 3 pages.
QUALCOMM, "Views on SRS", 3GPP TSG RAN WG1 Meeting #87, R1-1612049, Nov. 2016, 4 pages.
Samsung, "SRS design for NR", 3GPP TSG RAN WG1 Meeting #87, R1-1612491, Nov. 2016, 4 pages.
Huawei, et al., "Multiplexing of UL control channel and SRS in NR", 3GPP TSG RAN WG1 Meeting #87, R1-1611215, Nov. 2016, 3 pages.
LG Electronics, "Considerations on NR SRS design", 3GPP TSG RAN WG1 Meeting #87, R1-1611808, Nov. 2016, 6 pages.

* cited by examiner

FIG. 6

| XPDCCH | UL channel estimation-enable area with DMRS and xSRS within UL Data channel | xSRS |
| | UL channel estimated area with DMRS within UL Data channel | xPDCCH |
| | UL channel estimation-enable area with DMRS and xSRS within UL Data channel | xSRS |

$l_0$

METHOD FOR TRANSMITTING AND RECEIVING UPLINK CONTROL CHANNEL AND SOUNDING REFERENCE SYMBOL, AND APPARATUS THEREFOR

CROSS-REFERENCE TO RELATED APPLICATIONS

This application is the National Stage filing under 35 U.S.C. 371 of International Application No. PCT/KR2017/014700, filed on Dec. 14, 2017, which claims the benefit of U.S. Provisional Application No. 62/441,953, filed on Jan. 3, 2017, the contents of which are all hereby incorporated by reference herein in its entirety.

TECHNICAL FIELD

The present disclosure relates to a wireless communication system, and more particularly to, a method of transmitting and receiving an uplink control channel and a sounding reference symbol and apparatus therefor.

BACKGROUND

With the introduction of a new radio access technology (RAT) system, the necessity for mobile broadband communication much improved than the conventional RAT increases as a number of communication devices require higher communication capacity. In addition, massive machine type communications (MTC) capable of providing various services anytime and anywhere by connecting a number of devices or things to each other is one of the main issues discussed in the next generation communication system. Moreover, a communication system design capable of supporting services/user equipments (UEs) sensitive to reliability and latency is also under discussion. That is, the new RAT is expected to provide services by considering enhanced mobile broadband communication (eMBB), massive MTC (mMTC), ultra-reliable and low-latency communication (URLLC), etc.

DISCLOSURE OF THE INVENTION

Technical Task

An object of the present disclosure is to provide a method of transmitting, by a UE, an uplink control channel and a localized sounding reference symbol (SRS) by multiplexing the uplink control channel and the localized SRS.

Another object of the present disclosure is to provide a method of transmitting, by a UE, an uplink control channel and an SRS.

Still another object of the present disclosure is to provide a UE for transmitting an uplink control channel and a localized SRS by multiplexing the uplink control channel and localized SRS.

A further object of the present disclosure is to provide a UE for transmitting an uplink control channel and an SRS.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, provided is a method of transmitting, by a user equipment (UE), an uplink control channel and a localized sounding reference symbol (SRS). The method may include: receiving, from a base station, first control information for triggering transmission of the uplink control channel and second control information for triggering transmission of the localized SRS; and if a resource for transmitting the triggered uplink control channel overlaps with a resource for transmitting the triggered localized SRS and a length of a frequency band of the localized SRS is less than or equal to a length of a coherent bandwidth, segmenting the uplink control channel into a plurality of uplink control channel sub-blocks in a frequency domain and transmitting the uplink control channel sub-blocks. The segmented uplink control channel sub-blocks may be frequency division multiplexed with the triggered localized SRS and transmitted in one symbol. The triggered localized SRS may be transmitted in a band corresponding to a gap between the segmented uplink control channel sub-blocks in the frequency domain.

The first control information may include information on the resource for transmitting the uplink control channel, and the second control information may further include information on the resource for transmitting the localized SRS. The localized SRS may be transmitted on a resource corresponding to 4 resource blocks (RBs).

In another aspect of the present disclosure, provided is a method of transmitting, by a user equipment (UE), an uplink control channel and a sounding reference symbol (SRS). The method may include: transmitting a non-precoded SRS to a base station; if a resource for transmitting the uplink control channel overlaps with a resource for transmitting a precoded SRS, receiving, from the base station, a message indicating to multiplex and transmit the uplink control channel and the precoded SRS; and multiplexing and transmitting the uplink control channel and the precoded SRS based on the message.

The message may include a precoding matrix indicator (PMI) for the uplink control channel. The uplink control channel and the precoded SRS may be transmitted on a port to which a precoder corresponding to the PMI is applied. The uplink control channel, which is segmented into a plurality of uplink control channel sub-blocks, may be multiplexed with the precoded SRS and transmitted in a sub-band. The message may include resource locations of a plurality of uplink control channel sub-blocks obtained by segmenting the uplink control channel, a location of a sub-band in which the precoded SRS is to be transmitted, or a port number for transmitting the segmented uplink control channel sub-blocks.

In a further aspect of the present disclosure, provided is a user equipment (UE) for transmitting an uplink control channel and a sounding reference symbol (SRS). The UE may include: a receiver; a transmitter; and a processor. The processor may be configured to: control the receiver to receive, from a base station, first control information for triggering transmission of the uplink control channel and second control information for triggering transmission of the localized SRS; if a resource for transmitting the triggered uplink control channel overlaps with a resource for transmitting the triggered localized SRS and a length of a frequency band of the localized SRS is less than or equal to a length of a coherent bandwidth, control the transmitter to segment the uplink control channel into a plurality of uplink control channel sub-blocks in a frequency domain and transmit the uplink control channel sub-blocks; and control the transmitter to transmit the segmented uplink control channel sub-blocks and the triggered localized SRS in one symbol by applying frequency division multiplexing thereto.

Advantageous Effects

According to embodiments of the present disclosure, when a precoded SRS and a PUCCH are multiplexed, if the same port is used for the precoded SRS and the PUCCH, uplink channel estimation and PUCCH demodulation can be simultaneously performed using the precoded SRS.

The effects that can be achieved through the embodiments of the present disclosure are not limited to what has been particularly described hereinabove and other effects which are not described herein can be derived by those skilled in the art from the following detailed description. That is, it should be noted that the effects which are not intended by the present disclosure can be derived by those skilled in the art from the embodiments of the present disclosure.

DESCRIPTION OF DRAWINGS

The accompanying drawings, which are included to provide a further understanding of the invention and are incorporated in and constitute a part of this specification, illustrate embodiments of the invention.

FIG. 6 is a diagram illustrating the utilization of UL channel estimation in a self-contained subframe structure when an SRS+xPUCCH symbol is triggered.

MODE FOR THE INVENTION

Reference will now be made in detail to the preferred embodiments of the present disclosure, examples of which are illustrated in the accompanying drawings. In the following detailed description of the disclosure includes details to help the full understanding of the present disclosure. Yet, it is apparent to those skilled in the art that the present disclosure can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present disclosure may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

Moreover, in the following description, specific terminologies are provided to help the understanding of the present disclosure. And, the use of the specific terminology can be modified into another form within the scope of the technical idea of the present disclosure.

Figure 1:
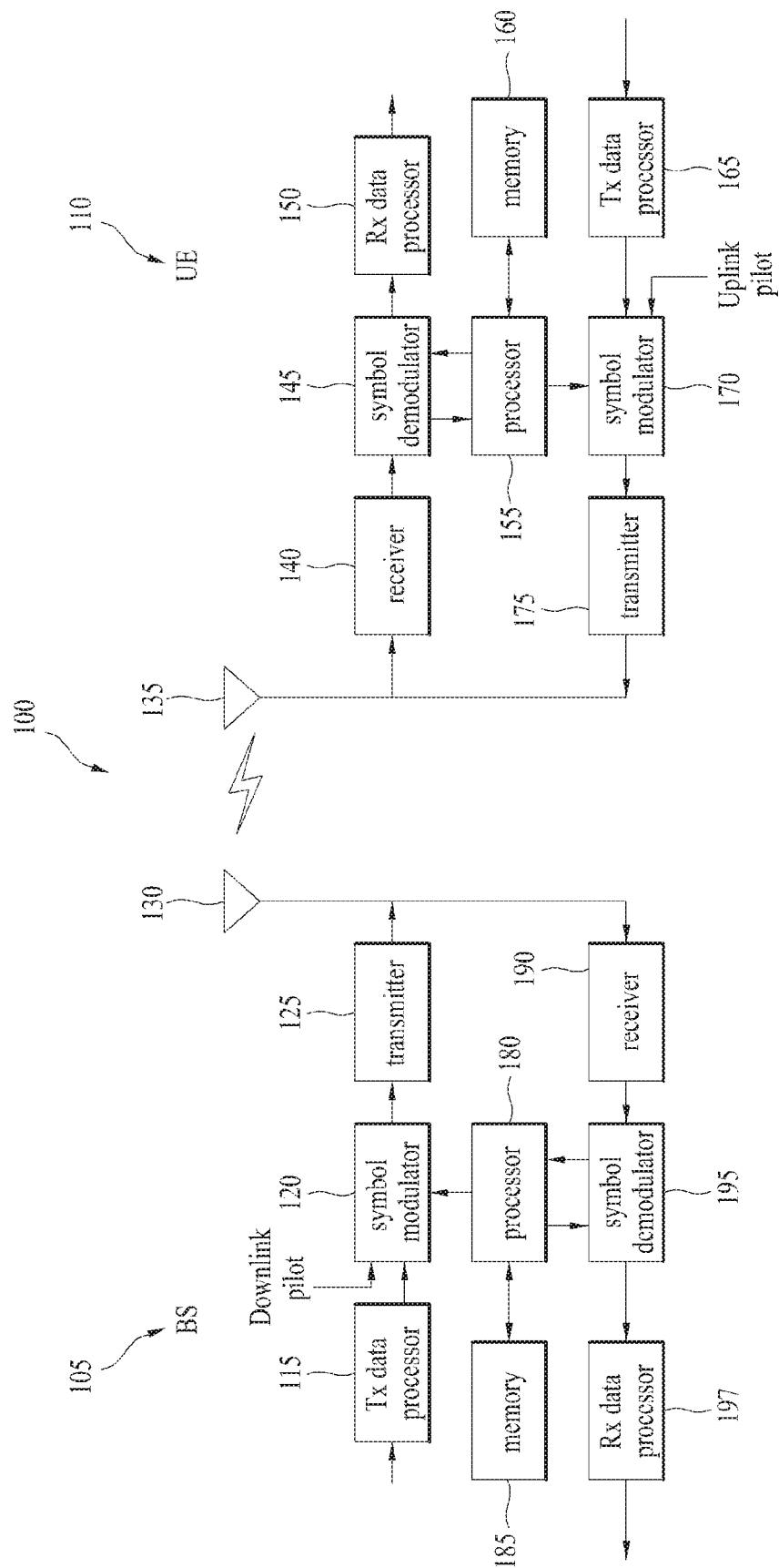
FIG. 1 is a block diagram for configurations of a base station 105 and a user equipment 110 in a wireless communication system 100.

FIG. 1 is a block diagram for configurations of a base station 105 and a user equipment 110 in a wireless communication system 100.

Although one base station 105 and one user equipment 110 are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present disclosure supports an MIMO (multiple input multiple output) system. And, the base station 105 according to the present disclosure may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present disclosure as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present disclosure using firmware or software, the firmware or software may be configured to include modules, procedures, and/or functions for performing the above-explained functions or operations of the present disclosure. And, the firmware or software configured to implement the present disclosure is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

For UE Tx beam tracking, a UE needs to transmit an SRS for each candidate Tx beam of the UE. However, if SRSs are transmitted in many beam directions (in accordance with a UE's Tx beam set for all directions), it may result in significant resource waste. Accordingly, the present disclosure proposes a method of achieving adaptive UE Tx beam tracking by performing SRS transmission flexibly according to UE pattern changes.

First, Table 1 below shows details of SRS transmission in the 3GPP LTE/LTE-A system.

TABLE 1

A UE shall transmit Sounding Reference Symbol (SRS) on per serving cell SRS resources based on two trigger types:
trigger type 0: higher layer signalling
trigger type 1: DCI formats 0/4/1A for FDD and TABLE 1-continued TDD and DCI formats 2B/2C/2D for TDD.
In case both trigger type 0 and trigger type
1 SRS transmissions would occur in the same
subframe in the same serving cell, the UE shall
only transmit the trigger type 1 SRS transmission.
A UE may be configured with SRS parameters
for trigger type 0 and trigger type 1 on
each serving cell. The following SRS
parameters are serving cell specific and semi-
statically configurable by higher layers
for trigger type 0 and for trigger type 1.
Transmission comb $\bar{k}_{TC}$, as defined in subclause
5.5.3.2 of [3] for trigger type 0 and
each configuration of trigger type 1
Starting physical resource block assignment
$n_{RRC}$, as defined in subclause 5.5.3.2 of
[3] for trigger type 0 and each configuration
of trigger type 1
duration: single or indefinite (until disabled),
as defined in [11] for trigger type 0
srs-ConfigIndex $I_{SRS}$ for SRS periodicity $T_{SRS}$
and SRS subframe offset $T_{offset}$, as
defined in Table 8.2-1 and Table 8.2-2 for
trigger type 0 and SRS periodicity $T_{SRS, 1}$, and
SRS subframe offset $T_{SRS, 1}$, as defined in
Table 8.2-4 and Table 8.2-5 trigger type 1
SRS bandwidth $B_{SRS}$, as defined in subclause
5.5.3.2 of [3] for trigger type 0 and each
configuration of trigger type 1
Frequency hopping bandwidth, $b_{hop}$, as
defined in subclause 5.5.3.2 of [3] for trigger type
0 Cyclic shift $n_{SRS}^{cs}$, as defined in subclause
5.5.3.1 of [3] for trigger type 0 and each
configuration of trigger type 1
Number of antenna ports $N_p$ for trigger
type 0 and each configuration of trigger type 1
For trigger type 1 and DCI format 4 three
sets of SRS parameters, srs-ConfigApDCI-
Format4, are configured by higher layer
signalling. The 2-bit SRS request field [4] in
DCI format 4 indicates the SRS parameter
set given in Table 8.1-1. For trigger type 1
and DCI format 0, a single set of SRS
parameters, srs-ConfigApDCI-Format0, is
configured by higher layer signalling. For
trigger type 1 and DCI formats 1A/2B/2C/2D,
a single common set of SRS parameters,
srs-ConfigApDCI-Format1a2b2c, is configured
by higher layer signalling. The SRS request
field is 1 bit [4] for DCI formats
0/1A/2B/2C/2D, with a type 1 SRS triggered
if the value of the SRS request field is set to '1'.
A 1-bit SRS request field shall be included in
DCI formats 0/1A for frame structure type
1 and 0/1A/2B/2C/2D for frame structure type
2 if the UE is configured with SRS
parameters for DCI formats 0/1A/2B/2C/2D
by higher-layer signalling.

Table 2 below shows SRS request values for trigger type 1 of DCI format 4 in the 3GPP LTE/LTE-A system.

TABLE 2

| Value of SRS request field | Description |
| --- | --- |
| '00' | No type 1 SRS trigger |
| '01' | The $1^{st}$ SRS parameter set configured by higher layers |
| '10' | The $2^{nd}$ SRS parameter set configured by higher layers |
| '11' | The $3^{rd}$ SRS parameter set configured by higher layers |

Table 3 below shows additional details of the SRS transmission in the 3GPP LTE/LTE-A system.

TABLE 3

The serving cell specific SRS transmission bandwidths $C_{SRS}$ are configured by higher layers. The allowable values are given in subclause 5.5.3.2 of [3].
The serving cell specific SRS transmission sub-frames are configured by higher layers. The allowable values are given in subclause 5.5.3.3 of [3].
For a TDD serving cell, SRS transmissions can occur in UpPTS and uplink subframes of the UL/DL configuration indicated by the higher layer parameter subframeAssignment for the serving cell.
When closed-loop UE transmit antenna selection is enabled for a given serving cell for a UE that supports transmit antenna selection, the index $a(n_{SRS})$, of the UE antenna that transmits the SRS at time $n_{SRS}$ is given by
$a(n_{SRS}) = n_{SRS}$ mod 2, for both partial and full sounding bandwidth, and when frequency hopping is disabled (i.e., $b_{hop} \geq B_{SRS}$), $$a(n_{SRS}) = \begin{cases} (n_{SRS} + \lfloor n_{SRS}/2 \rfloor + \beta \cdot \lfloor n_{SRS}/K \rfloor) \bmod 2 & \text{when } K \text{ is even} \\ n_{SRS} \bmod 2 & \text{when } K \text{ is odd} \end{cases}, \beta = \begin{cases} 1 & \text{where } K \bmod 4 = 0 \\ 0 & \text{otherwise} \end{cases}$$

when frequency hopping is enabled (i.e. $b_{hop} < B_{SRS}$),
where values $B_{SRS}, b_{hop}, N_b$, and $n_{SRS}$ are given in subclause 5.5.3.2 of [3], and $$K = \prod_{b'=b_{hop}}^{B_{SRS}} \left( \text{where } N_{b_{hop}} = 1 \text{ regardless of the } N_b \text{ value} \right), \text{except when a single } SRS$$

transmission is configured for the UE. If a UE is configured with more than one serving cell, the UE is not expected to transmit SRS on different antenna ports simultaneously.
A UE may be configured to transmit SRS on Np antenna ports of a serving cell where Np may be configured by higher layer signalling. For PUSCH transmission mode 1 $N_p \in \{0, 1, 2, 4\}$ and for PUSCH transmission mode 2 $N_p \in \{0, 1, 2\}$ with two antenna ports configured for PUSCH and $N_p \in \{0, 1, 4\}$ with 4 antenna ports configured for PUSCH. A UE configured for SRS transmission on multiple antenna ports of a serving cell shall transmit SRS for all the configured transmit antenna ports within one SC-FDMA symbol of the same subframe of the serving cell.
The SRS transmission bandwidth and starting physical resource block assignment are the same for all the configured antenna ports of a given serving cell.

TABLE 3-continued

A UE not configured with multiple TAGs shall not transmit SRS in a symbol whenever SRS and PUSCH transmissions happen to overlap in the same symbol.
For TDD serving cell, when one SC-FDMA symbol exists in UpPTS of the given serving cell, it can be used for SRS transmission. When two SC-FDMA symbols exist in UpPTS of the given serving cell, both can be used for SRS transmission and for trigger type 0 SRS both can be assigned to the same UE.
If a UE is not configured with multiple TAGs, or if a UE is configured with multiple TAGs and SRS and PUCCH format 2/2a/2b happen to coincide in the same subframe in the same serving cell,
The UE shall not transmit type 0 triggered SRS whenever type 0 triggered SRS and PUCCH format 2/2a/2b transmissions happen to coincide in the same subframe;
The UE shall not transmit type 1 triggered SRS whenever type 1 triggered SRS and PUCCH format 2a/2b or format 2 with HARQ-ACK transmissions happen to coincide in the same subframe;
The UE shall not transmit PUCCH format 2 without HARQ-ACK whenever type 1 triggered SRS and PUCCH format 2 without HARQ-ACK transmissions happen to coincide in the same subframe.
If a UE is not configured with multiple TAGs, or if a UE is configured with multiple TAGs and SRS and PUCCH happen to coincide in the same subframe in the same serving cell,
The UE shall not transmit SRS whenever SRS transmission and PUCCH transmission carrying HARQ-ACK and/or positive SR happen to coincide in the same subframe if the parameter ackNackSRS-SimultaneousTransmission is FALSE;
For FDD-TDD and primary cell frame structure 1, the UE shall not transmit SRS in a symbol whenever SRS transmission and PUCCH transmission carrying HARQ-ACK and/or positive SR using shortened format as defined in subclauses 5.4.1 and 5.4.2A of [3] happen to overlap in the same symbol if the parameter ackNackSRS-SimultaneousTransmission is TRUE.
Unless otherwise prohibited, the UE shall transmit SRS whenever SRS transmission and PUCCH transmission carrying HARQ-ACK and/or positive SR using shortened format as defined in subclauses 5.4.1 and 5.4.2A of [3] happen to coincide in th same subframe if the parameter ackNackSRS-SimultaneousTransmission is TRUE.
A UE not configured with multiple TAGs shall not transmit SRS whenever SRS transmission on any serving cells and PUCCH transmission carrying HARQ-ACK and/or positive SR using normal PUCCH format as defined in subclauses 5.4.1 and 5.4.2A of [3] happen to coincide in th same subframe.
In UpPTS, whenever SRS transmission instance overlaps with the PRACH region for preamble format 4 or exceeds the range of uplink system bandwidth configured in the serving cell, the UE shall not transmit SRS.
The parameter ackNackSRS-SimultaneousTransmission provided by higher layers determines if a UE is configured to support the transmission of HARQ-ACK on PUCCH and SRS in one subframe. If it is configured to support the transmission of HARQ-ACK on PUCCH and SRS in one subframe, then in the cell specific SRS subframes of the primary cell UE shall transmit HARQ-ACK and SR using the shortened PUCCH format as defined in subclauses 5.4.1 and 5.4.2A of [3], where the HARQ-ACK or the SR symbol corresponding to the SRS location is punctured.
This shortened PUCCH format shall be used in a cell specific SRS subframe of the primary cell even if the UE does not transmit SRS in that subframe. The cell specific SRS subframes are defined in subclause 5.5.3.3 of [3]. Otherwise, the UE shall use the normal PUCCH format 1/1a/1b as defined in subclause 5.4.1 of [3] or normal PUCCH format 3 as defined in subclause 5.4.2A of [3] for transmission of HARQ-ACK and SR.
Trigger type 0 SRS configuration of a UE in a serving cell for SRS periodicity, $T_{SRS}$, and SRS subframe offset, $T_{offset}$, is defined in Table 8.2-1 and Table 8.2-2, for FDD and TDD serving cell, respectively. The periodicity $T_{SRS}$ of the SRS transmission is serving cell specific and is selected from the set {2, 5, 10, 20, 40, 80, 160, 320} ms or subframes.
For the SRS periodicity $T_{SRS}$ of 2 ms in TDD serving cell, two SRS resources are configured in a half frame containing UL subframe(s) of the given serving cell.
Type 0 triggered SRS transmission instances in a given serving cell for TDD serving cell with $T_{SRS} > 2$ and for FDD serving cell are the subframes satisfying
$(10 \cdot n_f + k_{SRS} - T_{offset}) \mod T_{SRS} = 0$, where for FDD $k_{SRS} = \{0, 1, , , , 0\}$ is subframe index within the frame, for TDD serving cell $k_{SRS}$ is defined in Table 8.2-3. The SRS transmission instances for TDD serving cell with $T_{SRS} = 2$ are the subframes satisfying $k_{SRS} - T_{offset}$.
For TDD serving cell, and a UE configured for type 0 triggered SRS transmission in serving cell c, and the UE configured with the parameter EIMTA-MainConfigServCell-r12 for serving cell c, if the UE does not detect an UL/DL configuration indication for radio frame m (as described in section 13.1), the UE shall not transmit trigger type 0 SRS in a subframe of radio frame m that is indicated by the parameter eimta-HargReferenceConfig-r12 as a downlink subframe unless the UE transmits PUSCH in the same subframe.
Trigger type 1 SRS configuration of a UE in a serving cell for SRS periodicity, $T_{SRS,1}$, and SRS subframe offset, $T_{offset,1}$, is defined in Table 8.2-4 and Table 8.2-5, for FDD and TDD serving cell, respectively. The periodicity $T_{SRS,1}$ of the SRS transmission is serving cell specific and is selected from the set {2, 5, 10} ms or subframes.
For the SRS periodicity $T_{SRS,1}$ of 2 ms in TDD serving cell, two SRS resources are configured in a half frame containing UL subframe(s) of the given serving cell.
A UE configured for type 1 triggered SRS transmission in serving cell c and not configured with a carrier indicator field shall transmit SRS on serving cell c upon detection of a positive SRS request in PDCCH/EPDCCH scheduling PUSCH/PDSCH on serving cell c.

TABLE 3-continued

A UE configured for type 1 triggered SRS transmission in serving cell c and configured with a carrier indicator field shall transmit SRS on serving cell c upon detection of a positive SRS request in PDCCH/EPDCCH scheduling PUSCH/PDSCH with the value of carrier indicator field corresponding to serving cell c.
A UE configured for type 1 triggered SRS transmission on serving cell c upon detection of a positive SRS request in subframe n of serving cell c shall commence SRS transmission in the first subframe satisfying n + k, k ≥ 4 and
$(10 \cdot n_f + k_{SRS} - T_{offset,1}) \bmod T_{SRS,1} = 0$, for TDD serving cell c with $T_{SRS,1} > 2$ and for FDD serving cell c,
$(k_{SRS} - T_{offset,1}) \bmod 5 = 0$ for TDD serving cell c with $T_{SRS,1} = 2$
where for FDD serving cell c $k_{SRS} = \{0, 1, \ldots, 9\}$ is the subframe index within the frame $n_f$, for TDD serving cell c $k_{SRS}$ is defined in Table 8.2-3.
A UE configured for type 1 triggered SRS transmission is not expected to receive type 1 SRS triggering events associated with different values of trigger type 1 SRS transmission parameters, as configured by higher layer signalling, for the same subframe and the same serving cell.
For TDD serving cell c, and a UE configured with EIMTA-MainConfigServCell-r12 for a serving cell c, the UE shall not transmit SRS in a subframe of a radio frame that is indicated by the corresponding eIMTA-UL/DL-configuration as a downlink subframe.
A UE shall not transmit SRS whenever SRS and a PUSCH transmission corresponding to a Random Access Response Grant or a retransmission of the same transport block as part of the contention based random access procedure coincide in the same subframe.

Table 4 below shows the subframe offset configuration ($T_{offset}$) and UE-specific SRS periodicity ($T_{SRS}$) for trigger type 0 in FDD.

TABLE 4

| SRS Configuration Index $I_{SRS}$ | SRS Periodicity (ms) | SRS Subframe Offset |
|---|---|---|
| 0-1 | 2 | $I_{SRS}$ |
| 2-6 | 5 | $I_{SRS}$-2 |
| 7-16 | 10 | $I_{SRS}$-7 |
| 17-36 | 20 | $I_{SRS}$-17 |
| 37-76 | 40 | $I_{SRS}$-37 |
| 77-156 | 80 | $I_{SRS}$-77 |
| 157-316 | 160 | $I_{SRS}$-157 |
| 317-636 | 320 | $I_{SRS}$-317 |
| 637-1023 | reserved | reserved |

Table 5 below shows the subframe offset configuration ($T_{offset}$) and UE-specific SRS periodicity ($T_{SRS}$) for trigger type 0 in TDD.

TABLE 5

| SRS Configuration Index $I_{SRS}$ | SRS Periodicity (ms) | SRS Subframe Offset |
|---|---|---|
| 0-1 | 2 | $I_{SRS}$ |
| 2-6 | 5 | $I_{SRS}$-2 |
| 7-16 | 10 | $I_{SRS}$-7 |
| 17-36 | 20 | $I_{SRS}$-17 |
| 37-76 | 40 | $I_{SRS}$-37 |
| 77-156 | 80 | $I_{SRS}$-77 |
| 157-316 | 160 | $I_{SRS}$-157 |
| 317-636 | 320 | $I_{SRS}$-317 |
| 637-1023 | reserved | reserved |

TABLE 6

| SRS Configuration Index $I_{SRS}$ | SRS Periodicity (ms) | SRS Subframe Offset |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | ISRS-10 |
| 15-24 | 10 | ISRS-15 |
| 25-44 | 20 | ISRS-25 |
| 45-84 | 40 | ISRS-45 |
| 85-164 | 80 | ISRS-85 |
| 165-324 | 160 | ISRS-165 |
| 325-644 | 320 | ISRS-325 |
| 645-1023 | reserved | reserved |

Table 7 shows $k_{SRS}$ for TDD.

TABLE 7

| | subframe index n | | | | | | | | | |
|---|---|---|---|---|---|---|---|---|---|---|
| | | 1 | | | | | | 6 | | | |
| | 0 | 1st symbol of UpPTS | 2nd symbol of UpPTS | 2 | 3 | 4 | 5 | 1st symbol of UpPTS | 2nd symbol of UpPTS | 7 | 8 | 9 |
| $k_{SRS}$ in case UpPTS length of 2 symbols | 0 | 1 | 2 | 3 | 4 | 5 | 6 | 7 | 8 | 9 |

TABLE 7-continued

| | | subframe index n | | | | | | | | |
|---|---|---|---|---|---|---|---|---|---|---|
| | | 1 | | | | | 6 | | | |
| | 0 | 1st symbol of UpPTS | 2nd symbol of UpPTS | 2 | 3 | 4 | 5 | 1st symbol of UpPTS | 2nd symbol of UpPTS | 7 | 8 | 9 |
| $k_{SRS}$ in case UpPTS length of 1 symbol | | 1 | | 2 | 3 | 4 | | 6 | | 7 | 8 | 9 |

Table 8 below shows the subframe offset configuration ($T_{offset,1}$) and UE-specific SRS periodicity ($T_{SRS,1}$) for trigger type 1 in TDD.

TABLE 8

| SRS Configuration Index $I_{SRS}$ | SRS Periodicity (ms) | SRS Subframe Offset |
|---|---|---|
| 0-1 | 2 | ISRS |
| 2-6 | 5 | ISRS-2 |
| 7-16 | 10 | ISRS-7 |
| 17-31 | reserved | reserved |

Table 9 below shows the subframe offset configuration ($T_{offset,1}$) and UE-specific SRS periodicity ($T_{SRS,1}$) for trigger type 1 in TDD.

TABLE 9

| SRS Configuration Index $I_{SRS}$ | SRS Periodicity (ms) | SRS Subframe Offset |
|---|---|---|
| 0 | reserved | reserved |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$-10 |
| 15-24 | 10 | $I_{SRS}$-15 |
| 25-31 | reserved | reserved |

Figure 2:
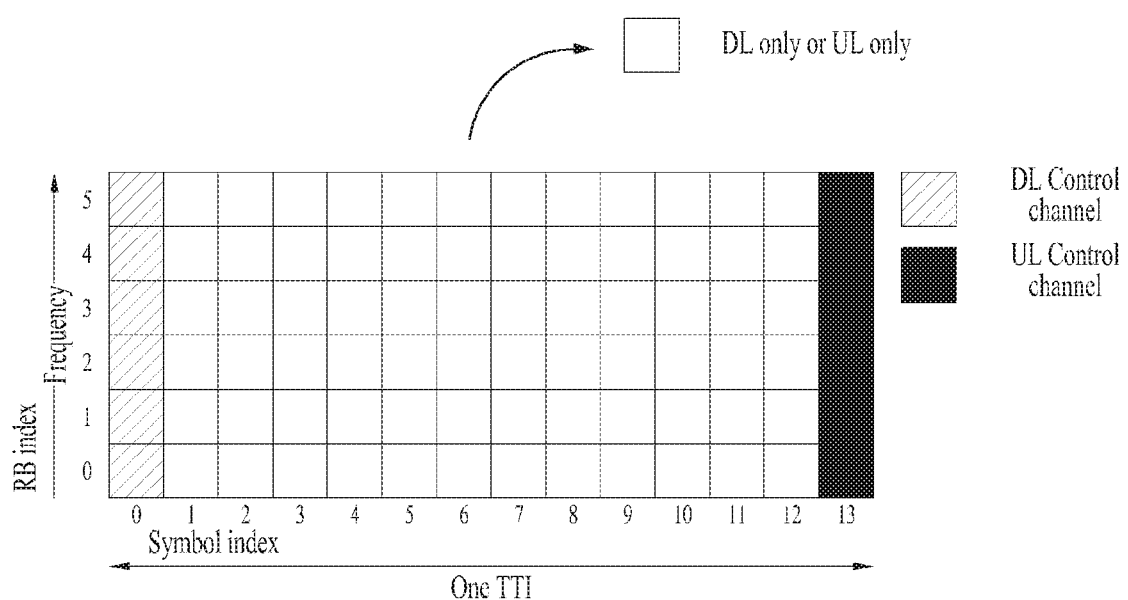
FIG. 2 is a diagram illustrating the structure of a subframe where TDM is applied to data and control channels.

FIG. 2 is a diagram illustrating the structure of a subframe where TDM is applied to data and control channels.

Specifically, FIG. 2 shows that TDM is applied to data and control channels in one subframe. In FIG. 2, the hatched area represents a Downlink (DL) control region (i.e., a resource region in which a DL control channel is transmitted), and the black area represents an Uplink (UL) control region (i.e., a resource region in which a UL control channel is transmitted). The unmarked area in the subframe of FIG. 2 can be used for DL or UL data transmission. According to this structure, it is possible to transmit DL data and receive UL ACK/NACK in a single subframe since DL transmission and UL transmission are sequentially performed in the single subframe. Consequently, when a data transmission error occurs, it is possible to reduce a time required until data is retransmitted, thereby minimizing the latency of the overall data transmission.

In the above subframe structure where the data and control channels are Time Division Multiplexed (TDMed), a time gap is required to allow a BS and a UE to switch from transmission mode to reception mode or vice versa. To this end, some Orthogonal Frequency Division Multiplexing (OFDM) symbols at the DL-to-UL switching time can be configured as a Guard Period (GP) in this subframe structure.

In FIG. 2, the hatched area represents a transmission region for a Physical Downlink Control Channel (PDCCH) carrying Downlink Control Information (DCI), and the last symbol is a transmission region for a Physical Uplink Control Channel (PUCCH) carrying Uplink Control Information (UCI). Here, the DCI corresponding to control information transmitted from an eNB (BS) to a UE may include information on a cell configuration that the UE should know, DL-specific information such as DL scheduling, UL-specific information such as a UL grant, etc. The UCI corresponding to control information transmitted from a UE to a BS may include an HARQ ACK/NACK report on DL data, a CSI report on a DL channel state, a Scheduling Request (SR), etc.

In FIG. 2, the unmarked area can be used for a data channel for transmitting DL data (e.g., Physical Downlink Shared Channel (PDSCH)) or a data channel for transmitting UL data (e.g., Physical Uplink Shared Channel (PUSCH)). According to this structure, an eNB (BS) can transmit DL data and receive an HARQ ACK/NACK signal from a UE in response to the DL data in a single subframe since DL transmission and UL transmission are sequentially performed in the single subframe. Consequently, when a data transmission error occurs, it is possible to reduce a time taken until data retransmission, thereby minimizing the latency of the overall data transmission.

In such a self-contained subframe structure, a time gap is required to allow a BS and a UE to switch from transmission mode to reception mode or vice versa. To this end, some OFDM symbols at the DL-to-UL switching time can be configured as a GP in this self-contained subframe structure.

In the new RAT system, the following four subframe types may be considered as examples of configurable self-contained subframe types. In the four subframe types, individual regions are arranged within a subframe in time order.

1) DL control region+DL data region+GP+UL control region

2) DL control region+DL data region

3) DL control region+GP+UL data region+UL control region

4) DL control region+GP+UL data region

Among new RAT system requirements, the most important one may be an environment where multiple services that require transmission of different control information, i.e., different measurement requirements coexist at the same time.

In the new RAT, it is expected that various numerologies/services will coexist, various UL channel structures will be present, and there will be many variations in measuring a UL channel due to a configuration such as UL beam sweeping, which was not present in the prior art. As a result, there may also be many variations in inter-cell interference (ICI). That is, since it is difficult to obtain and determine information on the ICI with many variations using conventional measurement and reporting methods, an interference measurement and reporting method suitable for the new RAT system needs to be considered. Hence, the present disclosure proposes a method of allocating measurement resources to mitigate UL ICI in the new RAT system.

Figure 3:
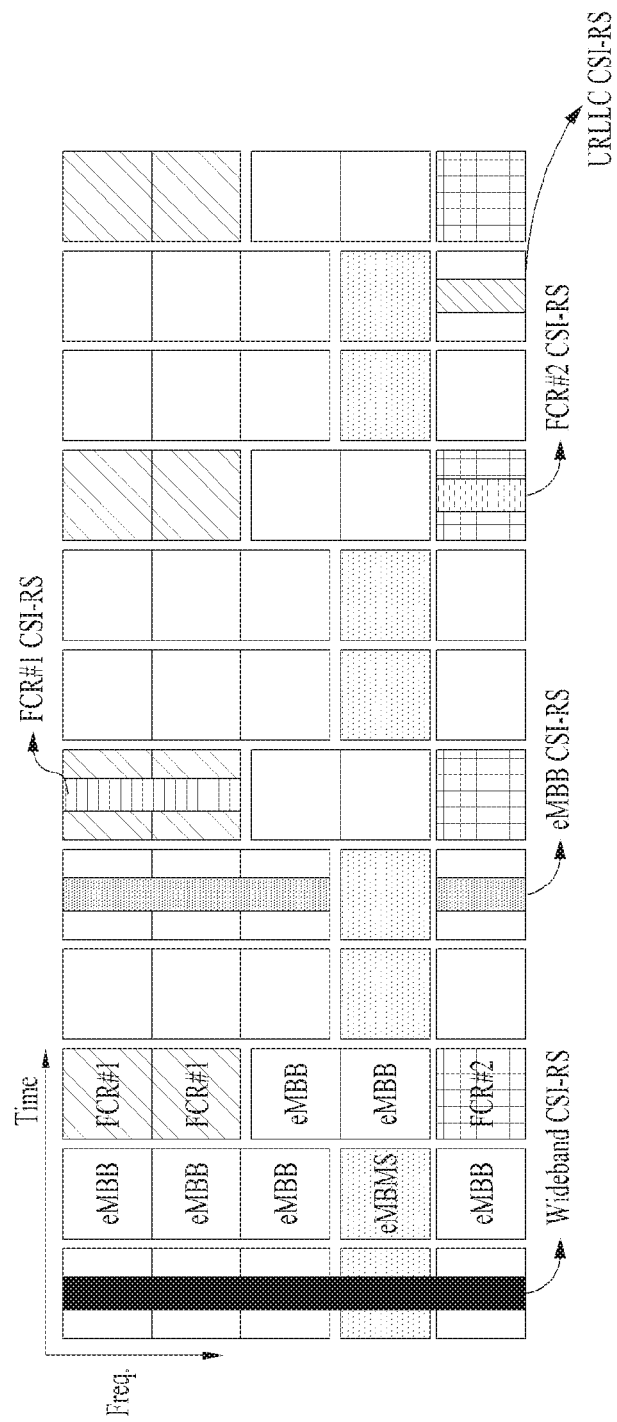
FIG. 3 is a diagram illustrating a hybrid (wideband and sub-band) CSI-RS structure for supporting various services in the new RAT.

FIG. 3 is a diagram illustrating a hybrid (wideband and sub-band) CSI-RS structure for supporting various services in the new RAT.

To simultaneously support various services of the new RAT, different CSI-RSs need to be formed in the wideband and sub-band structure in terms of DL transmission as shown in FIG. 3. If the structure of FIG. 3 is regarded as one of the new RAT requirements, UL resources may be formed in a similar manner.

Figure 4:
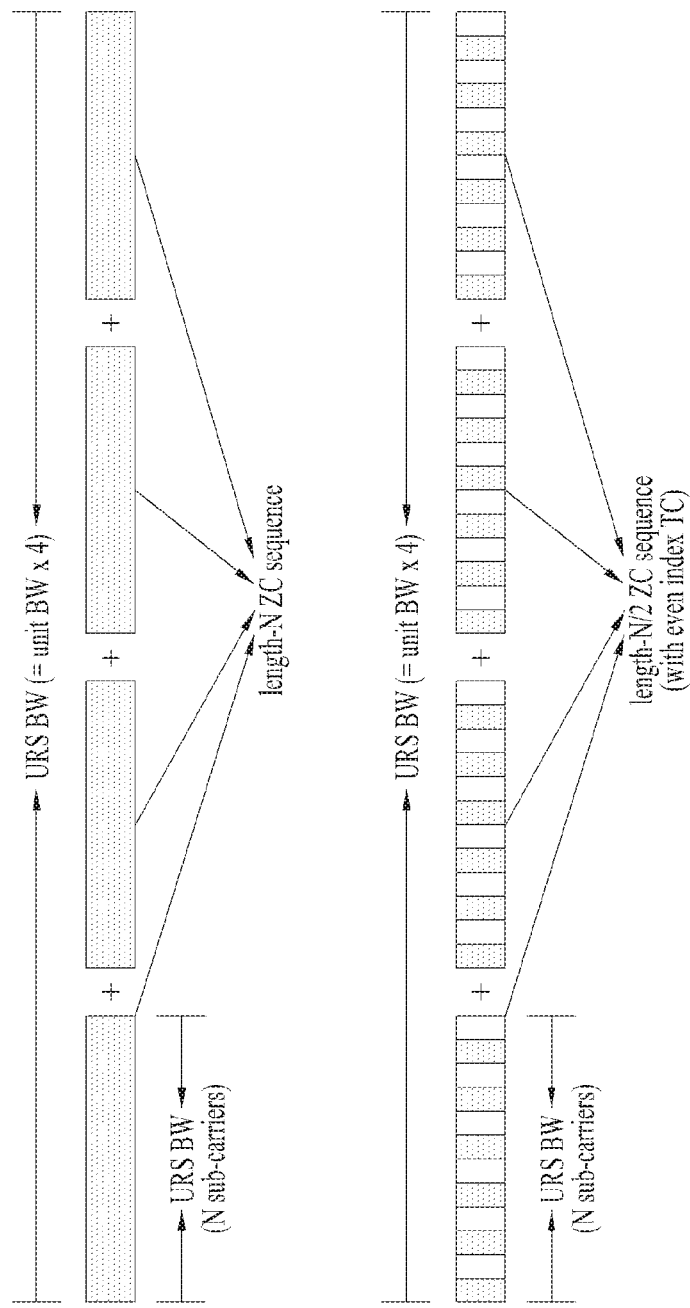
FIG. 4 is a diagram illustrating the definition of a localized uplink RS (URS) unit bandwidth (BW) and the deployment thereof (including transmission combs).

FIG. 4 is a diagram illustrating the definition of a localized uplink RS (URS) unit bandwidth (BW) and the deployment thereof (including transmission combs).

In a UL SRS structure (an SRS may be referred to as an xSRS in the new RAT), a UE may perform not only transmission in the whole band but also localized or distributed transmission in one symbol depending on service requirements. To efficiently allocate resources in the above structure, an SRS may be multiplexed with another UL channel (e.g., UL control channel).

It can be seen from FIG. 4 that the whole BW is divided into four localized SRS unit BWs. In particular, if a Zadoff-Chu (ZC) root index value or a pseudo random (PR) scrambling seed value is used to generate a localized SRS sequence, it may be determined based on at least one of a physical cell ID, virtual cell ID, UE-dedicated ID (e.g., C-RNTI), UE-common ID (e.g., UE-common RNTI), beam ID (or index), subframe index, symbol index, and AP index (for example, as a function thereof).

Structure According to UE Capability Requirement in New RAT

It is expected that the new RAT system requires a BS and a UE to satisfy the following requirements unlike the LTE system.

UE TRP increase: An increase in SRS dimensioning (for example, a port, a Cyclic Shift (CS), an Orthogonal Cover Code (OCC), a transmission comb, etc.) is required.

Advanced transceiver: An advanced transceiver structure is required to improve interference measurement reporting (network-assisted interference control).

UL beam tracking: A UL beam tracking structure is required when beam tracking needs to be performed not only for a DL channel but also for a UL channel (multi-symbol-wise SRS transmission).

Channel reciprocity: Structures are required for both cases where reciprocity between DL and UL channels is established and not established (a UL SRS needs to be supported for DL channel estimation).

For such various UE capability requirements, a dynamic and flexible SRS configuration is required, and for efficient control, a structure capable of supporting the configuration in a single UL framework should be established.

Figure 5:
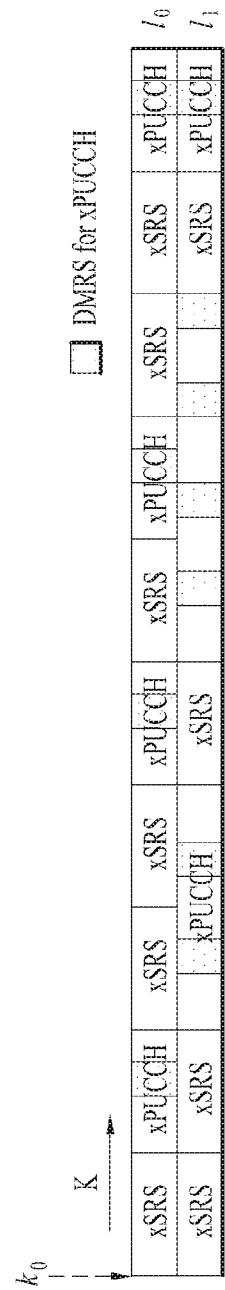
FIG. 5 is a diagram illustrating a DMRS required for channel multiplexing of an SRS and a PUCCH.

FIG. 5 is a diagram illustrating a DMRS required for channel multiplexing of an SRS and a PUCCH.

When localized SRS resources and UL control channel (e.g., PUCCH) resources coexist and they are distributed over the whole BW (frequency multiplexing), a DMRS for UL control is required to decode a PUCCH as shown in FIG. 5. In FIG. 5, each of $1_0$ and $1_1$ indicates a symbol index, and $k_o$ indicates a subcarrier index.

In the structure shown in FIG. 5, the length of a localized SRS can be equivalent to that of a resource element (RE), a resource block (RB), or an SRS unit (e.g., 4 RBs). Since the localized SRS is multiplexed with a PUCCH, a BS may estimate a UL data channel (e.g., PUSCH) in a sub-band-wise manner DMRSs may be located at a suitable interval within the PUCCH by considering a coherent BW (which shows similar channel characteristics). For example, two REs may be consecutively located at intervals of four REs, and thus ¼ REs may be present per RB. Such a frequency-domain multiplexing structure of a localized SRS and a PUCCH may be changed variously depending on the characteristics of a UL channel or the characteristics of a UL beam pair between a UE and a BS.

FIG. 6 is a diagram illustrating the utilization of UL channel estimation in a self-contained subframe structure when an SRS+xPUCCH symbol is triggered.

When channel estimation needs to be performed for sub-bands uniformly distributed over the whole BW, a structure where localized SRSs with short lengths are densely multiplexed with a PUCCH may also be modified suitably. In general, the length of a PUCCH is fixed by fixed Uplink Control Information (UCI) formats. According to this structure, channel estimation may be performed for a sub-band region using a DMRS for a UL data channel in a prat of an xPUCCH (a PUCCH may be referred to as an xPUCCH in the new RAT). However, if an SRS and xPUCCH multiplexing structure is enabled, the SRS and xPUCCH multiplexing structure needs to be further utilized to detect UL data more efficiently. To estimate a UL data channel, it is desirable to create a region where an xSRS and a DMRS in the data channel can be maximally used as shown in FIG. 6.

Proposal 1:

If a localized SRS is configured such that it has a suitable length compared to a UL frequency coherence length, i.e., $K_{localized\_SRS}^{(p)} \approx B_{coherent}$ (for example, if the frequency band length of the localized SRS is set to be less than or equal to the length of a coherent BW), a structure where the localized SRS is multiplexed with an xPUCCH in the frequency domain may be configured by segmenting the xPUCCH by the length of the localized SRS. A BS may transmit to a UE information on an SRS and PUCCH deployment structure for multiplexing thereof through RRC signaling (Layer 3), DCI (Layer 1), or a MAC-CE (Layer 2).

For example, the BS may transmit information on the length for cutting a PUCCH in the frequency domain and information on an SRS sequence configuration (for example, a root allocated to each localized SRS resource, a CS, a Transmission Comb (TC), etc.) depending on a change in the SRS and PUCCH deployment structure for the multiplexing thereof through RRC signaling, DCI (Layer 1), or a MAC-CE (Layer 2).

Figure 7:
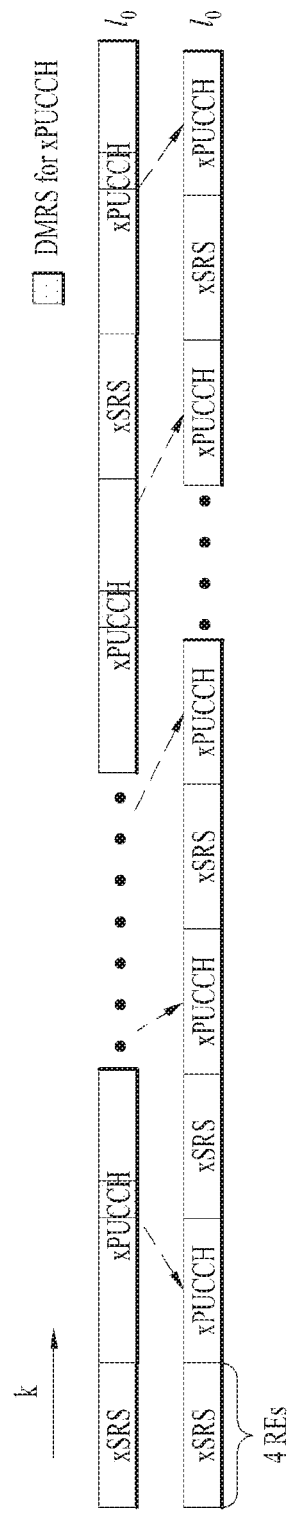
FIG. 7 is a diagram illustrating the segmentation of an xPUCCH format (6 RBs→18×4 REs).

FIG. 7 is a diagram illustrating the segmentation of an xPUCCH format (6 RBs→18×4 REs).

It is assumed that the length of the xPUCCH format is 6 RBs, the length of an xSRS unit is 4 REs, and a coherent BW is composed of 4 REs. If a 'localized SRS+xPUCCH' channel configuration is enabled by a serving cell (or a serving BS) and the xPUCCH is segmented by the xSRS unit as shown in FIG. 7, 18 (=12*6/4) xPUCCH sub-blocks may be generated. Thereafter, the serving BS may alternately allocate the xPUCCH and the xSRS unit to frequency-domain resources as shown in FIG. 7.

The most significant benefit of this structure is that the density of xPUCCH resources in symbols where the xSRS and xPUCCH are multiplexed is fixed, a UL channel estimation region increases, and the xSRS may also be used as a DMRS for the xPUCCH.

Proposal 1-1: As a sub-proposal of Proposal 1, it is proposed that a UE transmits an xSRS as a DMRS for a segmented xPUCCH (or for the same use as the DMRS). In this case, the UE transmits an xSRS unit (or localized SRS) on a port corresponding to an xPUCCH port. That is, the xSRS unit may be used not only as a DMRS for demodulating an adjacent xPUCCH resource but also for UL channel estimation in a related sub-band region by a BS.

Figure 8:
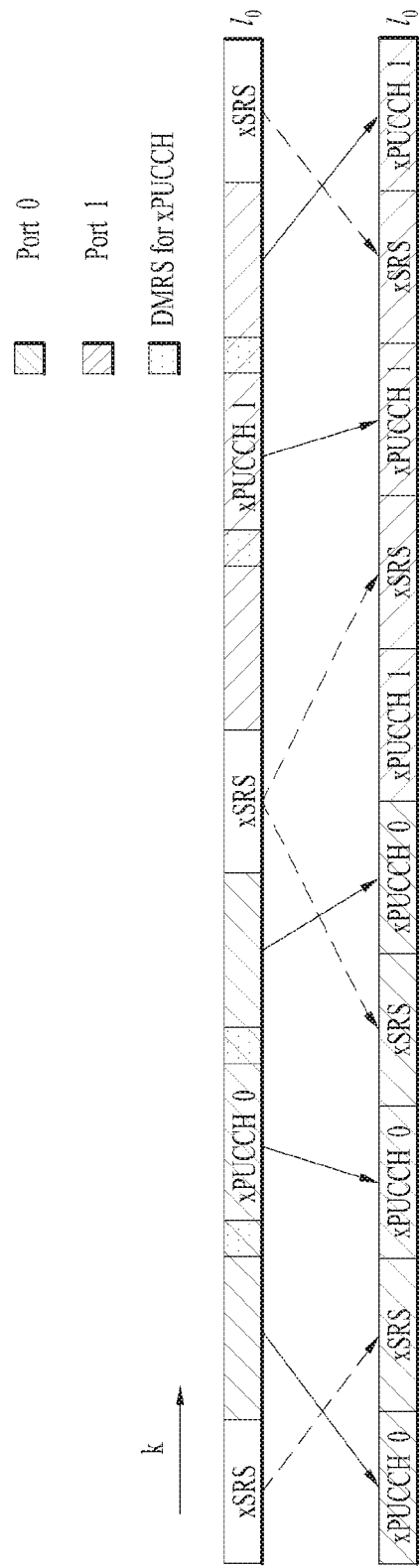
FIG. 8 is a diagram illustrating xPUCCH segmentation and xSRS port mapping.

FIG. 8 is a diagram illustrating xPUCCH segmentation and xSRS port mapping.

For example, assuming that when a different port is used for a symbol where an xSRS and an xPUCCH are multiplexed (for example, when ports 0 and 1 are used for xPUCCHs 0 and 1, respectively), the xPUCCH is segmented into three xPUCCH sub-blocks with respect to an xSRS unit, SRS ports positioned at the locations obtained by segmenting xPUCCH 0 may be set to xPUCCH port 0, and SRS ports positioned at the locations obtained by segmenting xPUCCH 1 may be set to xPUCCH port 1 as shown in FIG. 8. By doing so, for each xPUCCH, xSRS units with the same port may be transmitted as a DMRS. In addition, such an SRS may be used to estimate UL channels for allocated sub-bands.

Proposal 1-2: As another sub-proposal of Proposal 1, it is proposed that the structure according to Proposal 1-2 is applied to some xPUCCHs. In this case, whether the structure is applied or not may be determined depending on the number of xPUCCHs, the quality of a sub-band based on UL channel estimation, or different service states per sub-band.

Figure 9:
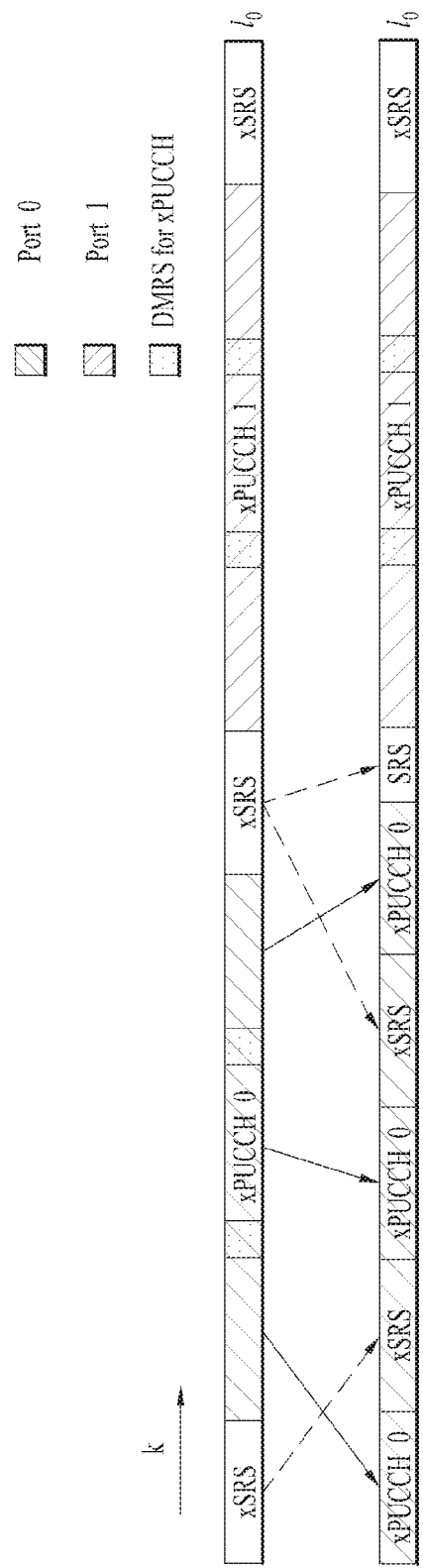
FIG. 9 is a diagram illustrating partial xPUCCH segmentation and xSRS port mapping.

FIG. 9 is a diagram illustrating partial xPUCCH segmentation and xSRS port mapping.

In FIG. 9, xPUCCH 0 may be a UL control channel for eMBB services, and xPUCCH 1 may be a UL control channel for URLLC services. For the eMBB services, xPUCCH 0 may be segmented into a plurality of xPUCCH sub-blocks and then transmitted.

As shown in FIG. 9, only xPUCCH 0 may be segmented into the plurality of xPUCCH sub-blocks, and xPUCCH 1 may be transmitted together with a DMRS for xPUCCH 1. In this case, a UE may transmit the frequency division multiplexed xPUCCH 0 sub-blocks and transmit xPUCCH 1 in a corresponding band without any segmentation as shown in FIG. 9.

Proposal 2:

If the proposed resource structure is partially enabled as mentioned in Proposal 1-2, there may be a region where a DMRS in an xPUCCH region is replaced with an xSRS and the length of the xSRS is changed as shown in FIG. 9. In this case, a BS may adjust an internal transmission comb structure for the changed xSRS unit or the number of UEs allocated within the xSRS unit.

Figure 10:
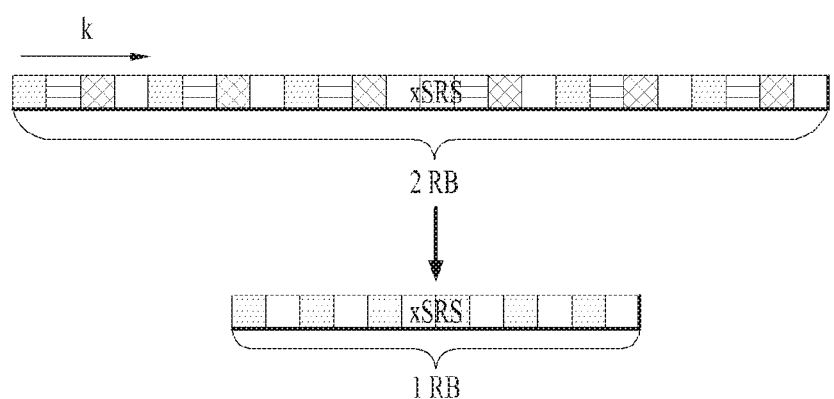
FIG. 10 is a diagram illustrating a variable xSRS resource allocation method.

FIG. 10 is a diagram illustrating a variable xSRS resource allocation method.

In FIG. 10, it is assumed that an xSRS unit has a comb of 4 (i.e., comb=4) and a length of 2 RBs. In addition, it is assumed that four UEs are allocated resources. If the length of the xSRS unit is changed to 1 RB (12 REs), a BS changes the comb to 2 (i.e., comb=2) and allocates the resources to two UEs. In this case, although the length of the xSRS unit decreases, the sequence length for each UE is maintained. Thus, sequence generation may be performed in the same manner as the conventional xSRS sequence generation.

Proposal 3:

When an xSRS+xPUCCH symbol (i.e., a symbol where an xSRS and an xPUCCH are multiplexed) is enabled in the structures of Proposals 1 and 2, a BS may schedule for a UE the xSRS+xPUCCH symbol according to Proposals 1 and 2 persistently, semi-persistently, or in an on-demand manner Proposal 4:

A BS may independently configure localized xSRS triggering and xPUCCH triggering. In this case, if a localized xSRS and an xPUCCH overlap with each other on the same resource, a resource allocation method may be required from the perspective of a UE. Specifically, if the conditions of Proposal 1 are satisfied, a UE changes the xSRS/xPUCCH multiplexing resource structure to a structure where a localized xSRS and a PUCCH are multiplexed and then provides feedback to inform the change. Hereinafter, each case and a resource allocation method therefor will be described.

When aperiodic DL CSI feedback or a PUCCH for ACK/NACK is triggered and it is indicated that a localized SRS is transmitted on allocated resources, a BS and a UE may operate according to the following three steps. In this case, the BS may transmit an indicator indicating PUCCH triggering and resources for PUCCH transmission through DCI. In addition, the BS may transmit an indicator indicating SRS triggering and resources for SRS transmission through the DCI.

1. The BS informs the UE of the location at which the CSI feedback is to be transmitted through the DCI.

2. The UE checks the CSI feedback location and the SRS location from the DCI received from the BS. If the conditions of Proposal 1 are satisfied, the UE segments the xPUCCH to be transmitted and transmits the requested CSI feedback information using xPUCCH sub-blocks. In this case, the UE may insert the localized xSRS between the xPUCCH sub-blocks. The BS may determine a multiplexing pattern in advance and then inform the UE of the multiplexing pattern through RRC signaling. The UE may feed the resource locations of the xPUCCH sub-blocks back to the BS. Upon receiving the resource locations of the xPUCCH sub-blocks from the UE, the BS may know the resource locations of xSRSs.

3. Based on the feedback information including the resource locations of the xPUCCH sub-blocks transmitted from the UE, the BS may perform decoding on the resources for the xPUCCH sub-blocks and localized xSRSs. The BS may obtain the feedback information from the xPUCCH sub-blocks and perform UL channel estimation using the localized xSRSs.

When UL localized-xSRS transmission is triggered and it is indicated that an xPUCCH for periodic DL CSI feedback is transmitted on allocated resources, a BS and a UE may operate according to the following three steps.

1. The BS may trigger the UL localized-xSRS transmission.

2. The UE checks the locations of the periodic CSI feedback and localized xSRSs. If the conditions of Proposed 1 are satisfied, the UE segments the xPUCCH to be transmitted and transmits the periodic CSI feedback using xPUCCH sub-blocks. In this case, the UE may insert the localized xSRS between the xPUCCH sub-blocks. The BS may determine a multiplexing pattern in advance and then inform the UE of the multiplexing pattern through RRC signaling. The UE may feed the resource locations of the xPUCCH sub-blocks back to the BS. Upon receiving the resource locations of the xPUCCH sub-blocks from the UE, the BS may know the resource locations of xSRSs.

3. Based on the feedback information including the resource locations of the xPUCCH sub-blocks transmitted from the UE, the BS may perform decoding on the resources for the xPUCCH sub-blocks and localized xSRSs. The BS may obtain the feedback information from the xPUCCH sub-blocks and perform UL channel estimation using the localized xSRSs.

As described above, if the condition that the length of a localized SRS unit is less than or similar to a coherent BW is satisfied in a symbol where a localized SRS and an xPUCCH, which are distributed over the whole BW, are frequency division multiplexed in the frequency domain, a UE may segment the xPUCCH into multiple xPUCCH sub-blocks and place the localized SRS between xPUCCH sub-blocks. Thereafter, the UE may transmit an xSRS, which may be used as a DMRS for each of the xPUCCH sub-blocks and, at the same time, used for estimating a UL data channel, on the same port as that of the xPUCCH. The structure where the xPUCCH sub-blocks and xSRS are multiplexed has advantages in that the density of xSRS resources increases while the density of xPUCCH resources is maintained at the same level.

In the new RAT, a UL SRS structure may be configured not only on whole band resources but also on sub-band-wise distributed resources, and thus, it is expected that an aperiodic network triggering approach method will be mainly used as a scheduling method.

According to an embodiment of the present disclosure, when sub-band SRS resources are triggered and when a UL control channel and a sub-band SRS are multiplexed, the sub-band SRS may be used as a DMRS for the UL control channel according to various multiplexing structures between the sub-band SRS and UL control channel.

Method of Multiplexing PUCCH and Precoded SRS

Proposal 4 proposes to perform multiplexing of a PUCCH and an SRS in a slot/subframe where PUCCH triggering and SRS triggering occurs at the same time. In particular, when the following two conditions (i.e., conditions 1 and 2) are satisfied, the PUCCH and SRS multiplexing is performed.

1. The condition that when a BS independently configures localized xSRS triggering and xPUCCH triggering, a precoded xSRS and an xPUCCH are allocated on the same resources in an overlapping manner FIG. 11 is a diagram illustrating the occurrence of a collision between PUCCH (or xPUCCH)/SRS due to a PUCCH (or xPUCCH)/SRS configuration.

Figure 11:
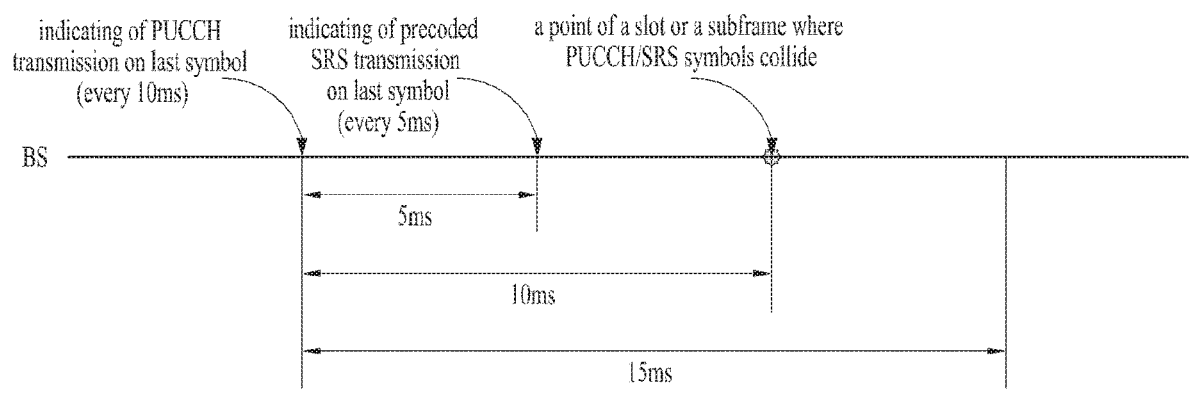
FIG. 11 is a diagram illustrating the occurrence of a collision between PUCCH (or xPUCCH)/SRS due to a PUCCH (or xPUCCH)/SRS configuration.

When PUCCH (or xPUCCH) transmission in the last symbol is triggered every 10 ms and when precoded SRS transmission in the last symbol is triggered every 5 ms, a PUCCH (or xPUCCH) symbol collides with an SRS symbol after 10 ms from the time at which the PUCCH (or xPUCCH) transmission is triggered as shown in FIG. 11.

Figure 12:
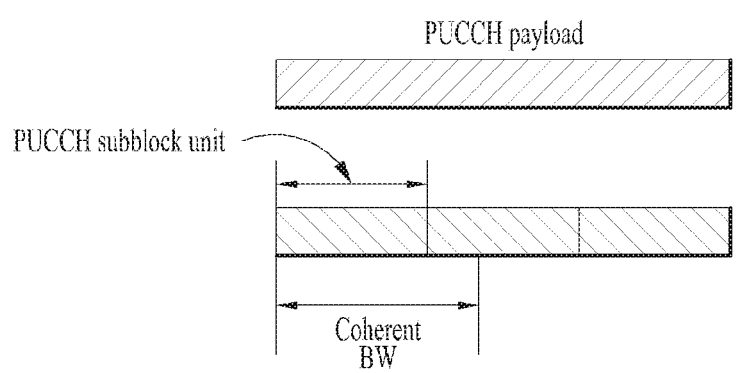
FIG. 12 is a diagram illustrating a case in which the length of a PUCCH sub-block unit is less than a coherent BW.

2. The condition that the length of a localized SRS unit is less than or similar to (or equal to) a coherent BW FIG. 12 is a diagram illustrating a case in which the length of a PUCCH sub-block unit is less than a coherent BW.

A multiplexing pattern may be configured when the length of a PUCCH sub-block unit obtained by segmenting a PUCCH is less than or equal to that of a coherent BW.

Proposal 5:

Case 1: Frequency-domain multiplexing is performed on a UL resource (e.g., slots, subframes, etc.) where a PUCCH and a precoded SRS are simultaneously configured.

Figure 13:
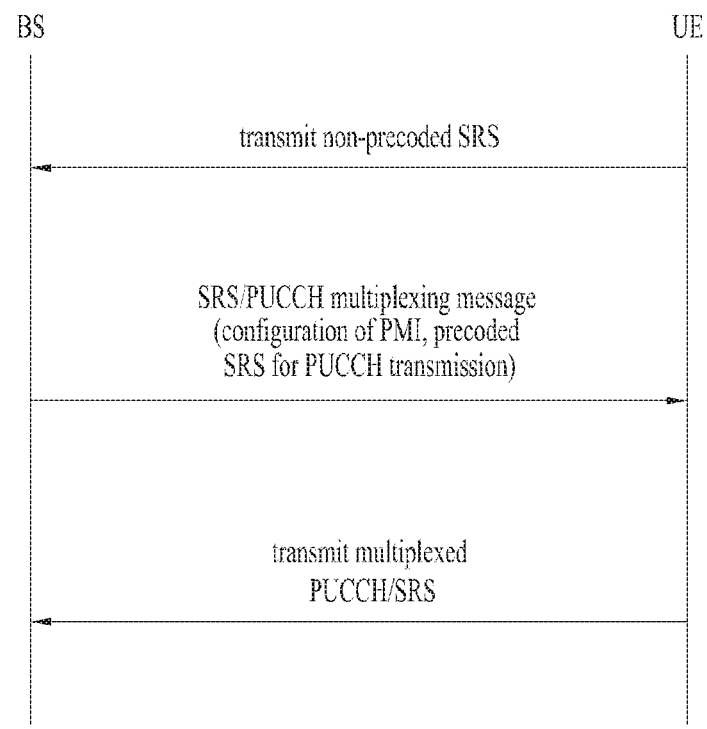
FIG. 13 is a flowchart for explaining Case 1.

FIG. 13 is a flowchart for explaining Case 1.

Referring to FIG. 13, a UE transmits a non-precoded SRS to a BS. Upon receiving the non-precoded SRS, the BS may estimate reception vectors for best UE Tx beams and then transmit, to the UE, a PMI for PUCCH transmission together with a message about a sub-band SRS (or localized SRS) configuration (i.e., SRS/PUCCH multiplexing message) in a UE-specific manner. If the PUCCH transmission overlaps with precoded SRS transmission on a certain resource due to precoded SRS triggering and PUCCH triggering (that is, if the PUCCH transmission and the precoded SRS transmission collide with each other due to simultaneous transmission), the BS may transmit the PMI for the PUCCH together with a message about a partial-band SRS configuration UE-specifically.

Upon receiving this message, the UE may multiplex the PUCCH and a partial-band SRS and then transmit the PUCCH and the partial band SRS on a port to which a precoder corresponding to the received PMI is applied. The message may include the PMI for the PUCCH, the physical resource locations of PUCCH sub-blocks, the number or index of a port for transmitting the PUCCH sub-blocks, the physical resource locations of sub-band SRSs, a flag indicating whether Case 1 is applied, etc. Based on the SRS/PUCCH multiplexing message, the UE may be configured with the PUCCH sub-blocks and the partial band SRSs. That is, after multiplexing the PUCCH and the SRS based on the SRS/PUCCH multiplexing message, the UE transmits the multiplexed PUCCH and SRS to the BS.

Case 2: Symbol-level multiplexing is performed on a UL resource (e.g., slots, subframes, etc.) where a PUCCH and a precoded SRS are simultaneously configured.

If transmission of a PUCCH with a large payload needs to be configured on a target UL resource (e.g., slot, subframe, etc.) toward a specific beam or port or if UL channel estimation needs to be performed over the whole band, a BS may set the index of a symbol for the PUCCH transmission to be different from that for SRS transmission and then inform a UE of the indices in a message about multiplexing of the PUCCH and a precoded SRS. The locations of the PUCCH and SRS symbols are configured by higher layers, and the locations may be identified by a PUCCH symbol triggering flag and an SRS symbol triggering flag. The message about the multiplexing of the PUCCH and precoded SRS may include a PMI for the PUCCH, a PUCCH transmission port number (or index), a PUCCH transmission symbol index, and an SRS transmission symbol index. If the locations of the PUCCH transmission symbol and SRS transmission symbol are predetermined by higher layers, the message about the multiplexing of the PUCCH and precoded SRS may further include a flag indicating whether the PUCCH transmission is triggered and a flag indicating whether the SRS transmission is triggered.

Proposal 6:

A UE may estimate the IDs of best UE Rx beams from DL channel estimation RSs or beam management RSs and transmit a message for requesting frequency multiplexing of a PUCCH and an SRS by considering a channel received on the related UE Rx beam. This request message may include a flag indicating whether a PUCCH is multiplexed with a precoded SRS and a UE Tx beam ID or a port index for the PUCCH/SRS multiplexing transmission.

Figure 14:
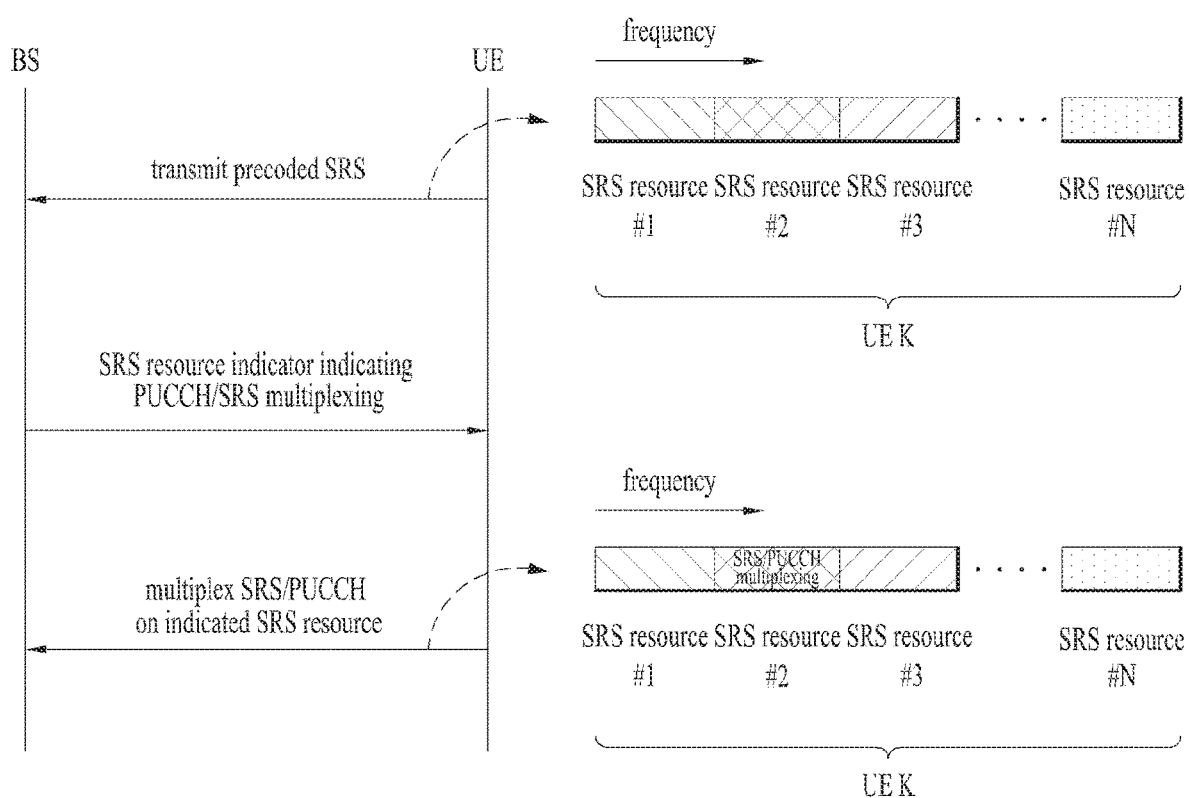
FIG. 14 is a diagram illustrating a procedure for transmitting a precoded SRS and multiplexing a PUCCH therewith.

Proposal 7:

FIG. 14 is a diagram illustrating a procedure for transmitting a precoded SRS and multiplexing a PUCCH therewith.

As shown in FIG. 14, a UE may transmit a precoded SRS in a different (time/frequency) region (i.e., SRS resource #1, SRS resource #2, SRS resource #3, etc.). A BS may receive precoded SRSs from each individual UE. If PUCCH transmission and precoded SRS transmission overlap on a certain resource due to precoded SRS triggering and PUCCH triggering (that is, if the PUCCH transmission and the precoded SRS transmission collide with each other due to simultaneous transmission), the BS may indicate to each UE multiplexing of a PUCCH and a precoded SRS through an SRS resource indicator. In this case, an SRS resource may be designated to indicate the multiplexing of the PUCCH and the precoded SRS. If the PUCCH transmission is triggered on a resource (e.g., slot, subframe, etc.) on which the corresponding precoded SRS is to be transmitted, the UE may segment the PUCCH into a plurality of PUCCH sub-blocks, multiplex the PUCCH sub-blocks and the precoded SRS, and then transmit the multiplexed PUCCH sub-blocks and precoded SRS as shown in FIG. 14. The BS may configure the location of the SRS resource in advance and inform the UE of the SRS resource location through higher layer signaling.

Figure 15:
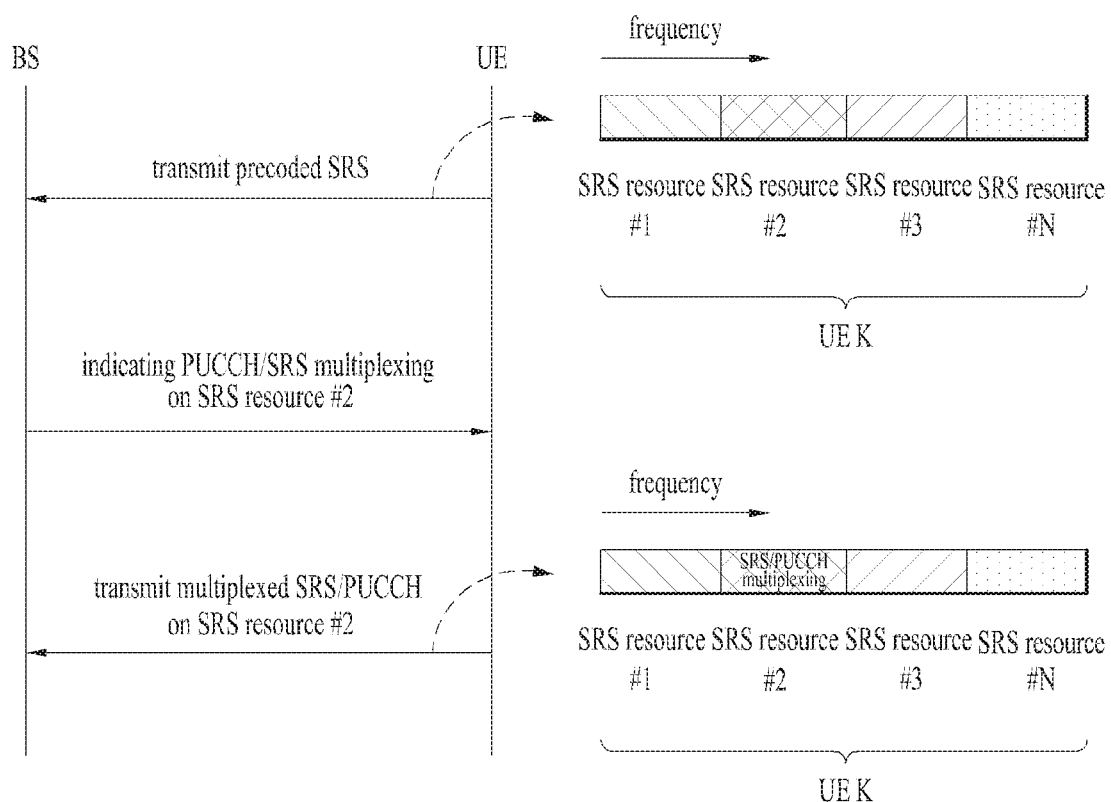
FIG. 15 is a diagram illustrating a procedure for transmitting a precoded SRS and multiplexing a PUCCH therewith.

FIG. 15 is a diagram illustrating a procedure for transmitting a precoded SRS and multiplexing a PUCCH therewith.

In FIG. 15, it is assumed that the number of resources for a precoded SRS of UE K is 4 (i.e., SRS resource #1, SRS resource #2, SRS resource #3, and SRS resource #4) and the resources for the precoded SRS are allocated in the frequency domain. The UE may transmit the precoded SRS. If PUCCH transmission and precoded SRS transmission overlap on a certain resource due to precoded SRS triggering and PUCCH triggering (that is, if the PUCCH transmission and the precoded SRS transmission collide with each other due to simultaneous transmission), a BS may transmit a message indicating the UE to multiplex and transmit a PUCCH and a precoded SRS. For example, this message may instruct to multiplex the PUCCH and the precoded SRS on SRS resource #2. According to the instruction included in the message, the UE may transmit the PUCCH and the precoded SRS by multiplexing them on SRS resource #2.

If a precoded SRS configuration collides with a PUCCH configuration, a BS may transmit, to a UE, a message indicating the UE to perform SRS/PUCCH multiplexing. The UE perform multiplexing of a precoded SRS and a PUCCH and transmit the multiplexed PUCCH and precoded SRS on the same port. Then, the BS may perform UL channel estimation and PUCCH demodulation at the same time using the precoded SRS.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The method of transmitting and receiving a UL control channel and a localized SRS, which are multiplexed, and apparatus therefor can be applied to various wireless communication systems including the 3GPP LTE/LTE-A system, the new RAT communication system, etc.

What is claimed is:

1. A method of transmitting, by a user equipment (UE), an uplink (UL) control channel and a localized sounding reference symbol (SRS), the method comprising:
  receiving, from a base station, first control information for triggering transmission of the uplink control channel and second control information for triggering transmission of the localized SRS;
  segmenting the uplink control channel into a plurality of uplink control channel sub-blocks by using a unit of the localized SRS in a frequency domain based on a predetermined condition being satisfied;
  transmitting the segmented uplink control channel sub-blocks; and
  transmitting the localized SRS using a port corresponding to a port of the UL control channel,
  wherein the predetermined condition is that a resource for transmitting the triggered uplink control channel overlaps with a resource for transmitting the triggered localized SRS and a length of a frequency band of the localized SRS is less than a length of a coherent bandwidth, and
  wherein the segmented uplink control channel sub-blocks are frequency division multiplexed with the triggered localized SRS and transmitted in one symbol.

2. The method of claim 1, wherein the triggered localized SRS is transmitted in a band corresponding to a gap between the segmented uplink control channel sub-blocks in the frequency domain.

3. The method of claim 1, wherein the first control information comprises information on the resource for transmitting the uplink control channel, and wherein the second control information further comprises information on the resource for transmitting the localized SRS.

4. The method of claim 1, wherein the localized SRS is transmitted on a resource corresponding to 4 resource blocks (RBs).

5. The method of claim 1, wherein whether to perform the segmenting is determined based on at least one of a number of UL control channels, a quality of a UL control channel sub-band based on UL channel estimation, or different service states per UL control channel sub-band.

6. A user equipment (UE) for transmitting an uplink (UL) control channel and a localized sounding reference symbol (SRS), the UE comprising:
  a receiver;
  a transmitter; and
  a processor configured to:
    control the receiver to receive, from a base station, first control information for triggering transmission of the uplink control channel and second control information for triggering transmission of the localized SRS;

segment the uplink control channel into a plurality of uplink control channel sub-blocks by using a unit of the localized SRS in a frequency domain based on a predetermined condition being satisfied; and control the transmitter to transmit the segmented uplink control channel sub-blocks and the triggered localized SRS using a port corresponding to a port of the UL control channel, wherein the predetermined condition is that a resource for transmitting the triggered uplink control channel overlaps with a resource for transmitting the triggered localized SRS and a length of a frequency band of the localized SRS is less than a length of a coherent bandwidth, and wherein the segmented uplink control channel sub-blocks are frequency division multiplexed with the triggered localized SRS and transmitted in one symbol.

7. The UE of claim 6, wherein whether to perform the segmenting is determined based on at least one of a number of UL control channels, a quality of a UL control channel sub-band based on UL channel estimation, or different service states per UL control channel sub-band.

* * * * *